May 23, 1961 W. E. FRITZ 2,985,778
SYNCHRONOUS MOTOR

Filed March 21, 1958 2 Sheets-Sheet 1

INVENTOR.
William E. Fritz
BY
M. H. Strickland
His Attorney

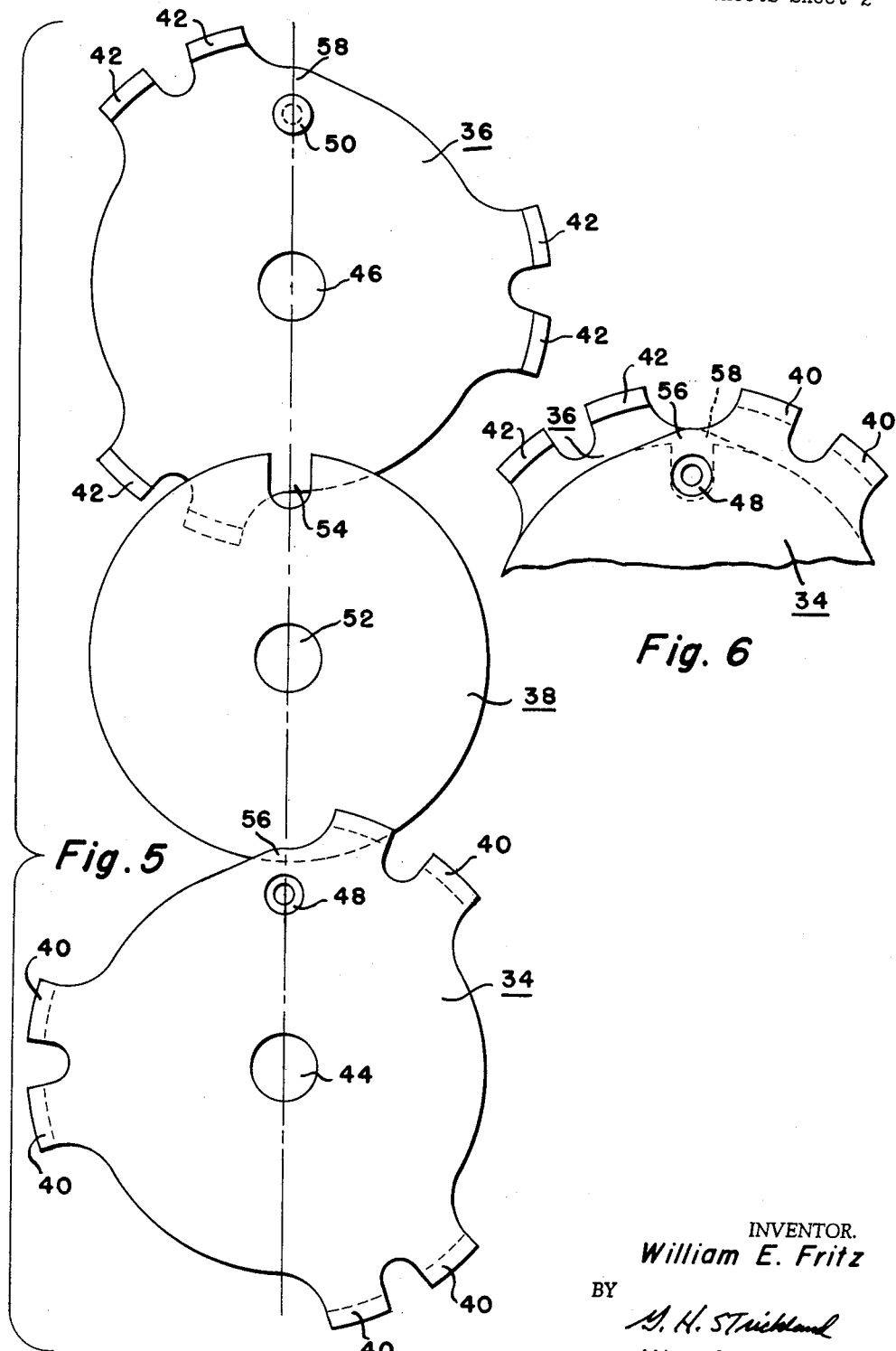

_United States Patent Office_

2,985,778
Patented May 23, 1961

2,985,778

SYNCHRONOUS MOTOR

William E. Fritz, Rochester, N.Y., assignor to General Motors Corporation, Detroit, Mich., a corporation of Delaware Filed Mar. 21, 1958, Ser. No. 722,887

12 Claims. (Cl. 310—41)

This invention pertains to synchronous motors, and particularly to self-starting synchronous motors of the inductor type including direction controlling means.

One of the problems encountered with the use of conventional shaded pole self-starting synchronous motors in operating timers is that of low starting and running torques. The present invention relates to an improved rotor construction and a synchronous motor embodying the novel rotor construction which has starting and running torques several times greater than conventional shaded pole synchronous motors. In addition, direction controlling means are incorporated in the motor for determining the direction of rotation, the direction controlling means being externally adjustable for changing the direction of motor rotation when the rotor is either stationary or rotating.

Accordingly, among my objects are the provision of an improved permanent magnet rotor assembly for alternating current motors; the further provision of a self-starting synchronous motor having high starting and running torques; the further provision of an inductor type synchronous motor including a direction controlling device; and the still further provision of an external means for adjusting the direction controlling device so as to obtain rotation of the motor in either direction.

The aforementioned and other objects are accomplished in the present invention by incorporating an axially magnetized permanent magnet in the rotor assembly and an adjustable stop means in the direction controlling device. Specifically, the motor includes a housing which supports a core of magnetic material having a winding positioned therearound. The housing is formed to constitute an outer pole member of a stator, and an inner pole member of the stator is secured to the opposite side of the winding. Each stator pole member has an equal number of equiangularly spaced teeth extending axially therefrom. The pole teeth of one stator pole member are disposed between the pole teeth of the other stator pole member to form stator poles arranged circularly about an axis. A rotor, comprising a pair of pole plates and an axially magnetized permanent disc magnet is centrally located within the stator and rotatably journalled on a shaft supported in the housing. Each pole plate of the rotor is formed with circumferentially spaced pairs of pole teeth extending axially in opposite directions and circumscribing the disc magnet.

The rotor structure is designed so that two poles of like polarity are disposed in side by side relationship. Moreover, the angular spacing of the rotor poles of like polarity is twice that of the stator poles, and the angular displacement between adjacent rotor poles of opposite polarity is three times the pole pitch of the stator poles. This arrangement assures that the rotor will always rotate in one direction or the other upon energization of the stator winding. Moreover, the rotor construction utilizing a disc magnet results in a synchronous motor having substantially greater starting and running torques than conventional shaded pole synchronous motors.

Since the rotor structure can rotate in either direction depending upon the cycle of the alternating current on initial energization of the stator winding, and thus the initial polarity of the stator poles, a direction controlling device must be incorporated in the motor. In the instant motor, the rotor is connected to a pinion gear forming part of the reduction gear train. The first stage reduction includes a gear journalled on a shaft carried by the housing and which frictionally engages a gear segment. The gear segment has a pair of circumferentially spaced toothed portions which are engageable with the pinion gear attached to the rotor. The gear segment is formed with an arcuate cut-out diametrically opposite the toothed portion within which a pivotally mounted lever is disposed. The lever is connected to a pivot pin rotatably journalled in the housing and extending outside thereof, a second lever being attached to the pivot pin externally of the housing. The internal lever prevents angular movement of the gear segment in one direction, this being the desired direction of motor rotation. If the motor should rotate in the opposite direction, the gear segment will be frictionally driven by the first gear of the gear reduction so that one of the toothed portions engages the pinion gear. At the same time, the other end of the gear segment engages the internal lever thereby preventing further movement of the gear segment and thus arresting rotation of the rotor in the wrong direction. After the alternating current polarity of the stator winding changes, the rotor will move in the reverse direction which is the desired direction of motor rotation.

In order to change the running direction of the motor, the external lever is moved from one of its limit positions to its other limit position whereupon the internal lever coacts with the gear segment to prevent angular movement of the gear segment in the opposite direction. The direction of motor rotation can be changed when the motor is rotating or when it is stationary.

Further objects and advantages of the present invention will be apparent from the following description, reference being had to the accompanying drawings, wherein a preferred embodiment of the present invention is clearly shown.

In the drawings:

Figure 5 is an exploded view depicting the rotor assembly constructed according to the preferred embodiment of this invention.

Figure 6 is an enlarged fragmentary view in elevation of the preferred rotor assembly.

Figure 2:
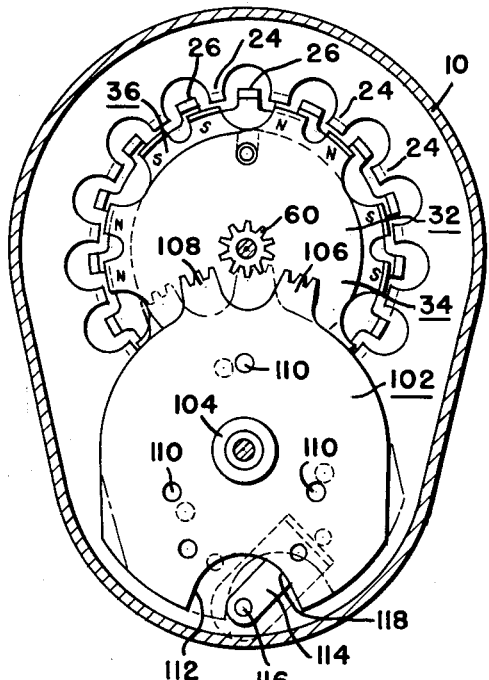
Figure 2 is a sectional view taken along line 2—2 of Figure 1.
Figure 1:
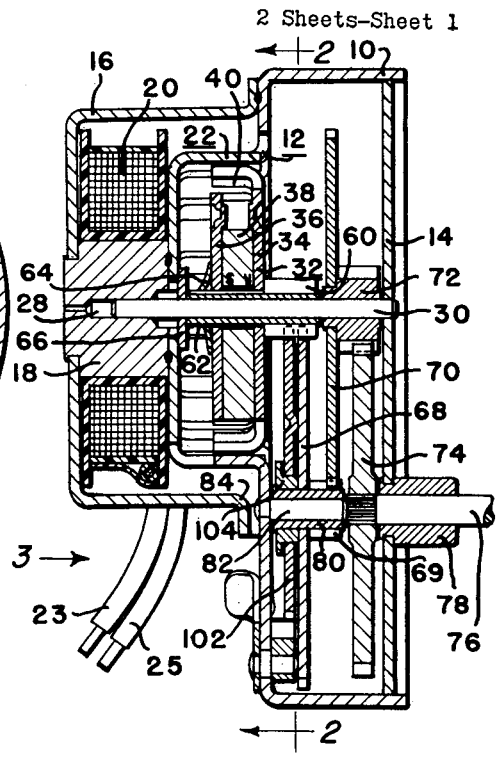
Figure 1 is a sectional view of a synchronous motor constructed according to this invention.

With particular reference to Figures 1 and 2, a synchronous motor is shown including a gear housing 10 formed of magnetic materially, the central portion thereof constituting the outer pole member 12 of the stator. The gear housing 10 is closed at one end by a cover 14 suitably secured thereto, the other side of the gear housing being closed by a cup-shaped member 16 of magnetic material suitably secured to the housing 10 such as by welding. A core 18 of magnetic material is centrally located within the cup-shaped member 16 and is suitably secured in a central opening thereof by such means as staking. A winding 20 is positioned around the core 18, opposite ends of the winding 20 being connected to leads 23 and 25 for connecting the windings to suitable source of alternating current such as a 115 volt 60 cycle source.

An inner pole member 22 is secured to the core 18 by any suitable means, such as by welding. The inner and outer poles 12 and 22 constitute the stator member. The outer pole 12 has an annular row of fifteen equally spaced axially extending pole teeth 24. The inner pole member 22 of magnetic material likewise has an annular row of fifteen axially extending equally spaced pole teeth 26 which are disposed between the pole teeth 24 on the outer pole member 12. Thus, in the preferred embodiment the stator has thirty poles which are spaced 12° apart. Moreover, at any instant when the winding 20 is energized adjacent poles of the stator, that is poles 24 and 26, are of opposite magnetic polarity.

The core 18 has a central bore 28 which receives one end of a fixed shaft 30. The other end of the shaft 30 is suitably secured to the cover 14. A rotor assembly 32 is centrally located within the stator, as shown in Figure 2. The rotor assembly comprises a pair of magnetic steel pole plates 34 and 36 and an axially magnetized permanent disc magnet 38 having North and South pole faces as indicated.

With particular reference to Figures 5 and 6, the pole plate 34, in the preferred embodiment, is formed with three circumferentially spaced pairs of teeth 40 which are bent at right angles to the plate 34. The teeth 40 form salient poles of the same magnetic polarity when assembled with the disc magnet 38. The pole plate 36 likewise has three sets of circumferentially spaced teeth 42 which are bent at right angles in the direction opposite to that of the teeth 40 on the pole plate 34. The rotor poles 40 and 42 are wider than the stator poles 24 and 26. The pole plates 34 and 36 are centrally apertured as indicated by numerals 44 and 46, respectively. In addition, the pole plates 34 and 36 have formed therein aligning dowels 48 and 50, respectively. The disc magnet 38 is formed with a central aperture 52 and a radially extending peripheral slot 54 designed to receive the locating dowels 48 and 50 on the pole plates 34 and 36 so as to obtain the proper angular position of the pole plates relative to each other. The pole plate 34 has a radial extension 56 radially aligned with the dowel 48, and pole plate 36 has a similar radial extension 58 aligned with the dowel 50. The extensions 56 and 58 are aligned with the slot 54 in the disc magnet 38, as shown in Figure 6 when the rotor is assembled, the mass of the radial extensions 56 and 58 compensating for the material removed from the disc magnet 38 by forming the slot 54 so as to produce a rotor assembly which is well balanced. The rotor assembly is maintained in assembled relation with a pinion gear 60 of nonmagnetic material having a partially turned sleeve 62 by a sheet metal nut 64. The pinion gear 60 is rotatably journalled on the shaft 30 and is spaced from the inner pole member 22 by a washer 66.

The pinion gear 60 meshes with a gear 68 of the gear reduction unit. The gear 68 is suitably attached to a pinion gear 69 which meshes with a gear 70 attached to the hub of a pinion gear 72 which is rotatably journalled on the shaft 30. The pinion gear 72 meshes with a gear 74 which is attached to an output shaft 76 rotatably journalled by a bearing 78 carried by the cover 14. The pinion 69 is formed with an integral hub 80 which is journalled on a stub shaft 82 attached to the housing 10. The cup-shaped member 16 has an off-set rim portion 84 spaced from the housing 10 to accommodate the headed end of the shaft 82.

The rotor structure disclosed in Figures 2, 5 and 6 is particularly designed for use with an axially magnetized permanent magnet where a large cross-sectional area and a short flux must be used. The diameter of the disc magnet is only slightly less than the diameter of the salient poles so that the rotor operates at the maximum energy product, thereby resulting in high starting and running torques.

One of the important features of the rotor construction of this invention concerns the spacing of the sets of salient poles 40 and 42. There is a definite relationship between the pole pitch of the stator and the angular space between adjacent rotor poles of the same polarity and the angular space between adjacent rotor poles of opposite magnetic polarity. The relationship between the pole pitch of the stator and the salient poles on the rotor assures that the motor will be self-starting. In the preferred embodiment wherein the stator has thirty poles, the pole pitch of the stator is 12°, while the angle between adjacent rotor poles of the same polarity is 24°. The angular displacement between adjacent poles of opposite polarity on the rotor is 36°. The synchronous speed of this rotor with 60 cycle alternating current energization of the stator is 240 r.p.m.

Figure 4:
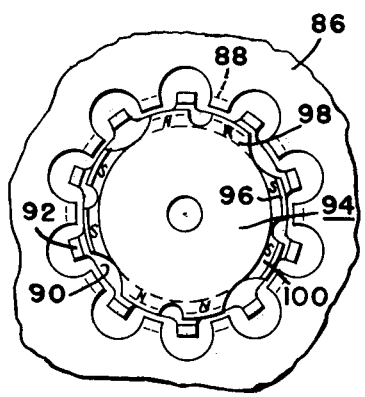
Figure 4 is a fragmentary view in elevation depicting a rotor and stator of a modified synchronous motor constructed according to the present invention.

With reference to Figure 4, a motor is shown having a stator with twenty pole teeth. The outer pole member 86 has ten equally spaced pole teeth 88 and the inner pole member 90 has ten equally spaced pole teeth 92. In this instance, the pole pitch of the stator is 18°. Accordingly, the rotor constructed according to the present invention will have pole plates 94 and 96 wherein the angle between adjacent poles of the same polarity is 36° and the angle between adjacent poles of opposite polarity is 54°. Thus, the pole teeth 98 on the pole plate are spaced 36° apart as are the pole teeth 100 on the pole plate 96. However, adjacent poles of opposite polarity on the pole plates 94 and 96 are spaced 54° apart. The synchronous speed of this motor with 60 cycle current is 360 r.p.m.

With particular reference to Figures 1 and 2, when the winding 20 is deenergized, the rotor 32 will take a repose position of minimum reluctance in the magnetic path between the rotor and the stator, as shown in Figure 2. Upon energization of the coil 20, if the stator poles 26 become north poles and the stator poles 24 become south poles, the rotor 32 will rotate in the counterclockwise direction to the attraction between opposite poles and the repulsion between the poles of the same polarity. On the other hand, should the stator poles 24 become north poles and the stator poles 26 become south poles, upon initial energization of the winding 20, the rotor 32 will rotate in the clockwise direction. Since the rotor 32 may rotate in either direction, depending upon the initial magnetic polarity of the stator poles upon energization of the coil 20, a direction controlling device must be incorporated in the motor to prevent rotation of the rotor in the wrong direction.

Figure 3:
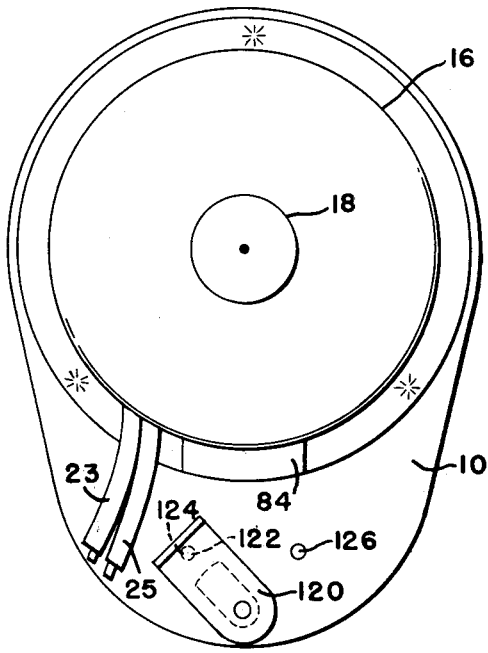
Figure 3 is a view in elevation taken in the direction of arrow 3 of Figure 1.

As seen in Figures 1 through 3, a gear segment 102 is rotatably journalled on a bushing 104 carried by the hub 80 of the pinion gear 69. The gear segment 102 has a pair of angularly spaced toothed portions 106 and 108 which are in engagement with the pinion gear 60. In addition, the gear segment 102 has three dimples 110 formed therein which engage the gear 68 so as to space the toothed portions 106 and 108 from the teeth of the gear 68. The gear segment 102 frictionally engages the gear 68, and thus will tend to rotate in the direction of rotation of the gear 68.

The gear segment 102 is formed with an arcuate cutout 112 diametrically opposite the tooth portions 106 and 108. A lever 114 rigidly attached to a pivot pin 116 is formed with an arcuate end 118 engaging the edge of the arcuate cut-out 112. The pivot pin 116 extends through the gear housing 10 and has a lever 120 attached thereto. The lever 120 may be made of resilient material, such as spring steel and is formed with a dimple 122 engageable with either depression 124 or 126 in the gear housing 10. The gear segment has a neutral position as shown in full lines in Figure 2, and two arresting positions, one of which is shown in dotted lines in Figure 2.

The lever 114 constitutes a direction controlling device which operates in the following manner. With the lever 114 in the position shown in Figure 2, engagement of end 118 with the edge of the arcuate cut-out 112 prevents angular movement of the gear segment 102 in the clockwise direction. Accordingly, if the rotor 32 rotates in the counterclockwise direction as viewed in Figure 2, thereby imparting clockwise rotation to the gear 68 neither of the toothed segments 106 and 108 will engage the pinion gear 60. However, if the rotor 32 should rotate in the clockwise direction so as to impart counterclockwise rotation to the gear 68, the gear segment 102 will move angularly in the counterclockwise direction so that toothed portion 106 will engage the pinion 60. Angular movement of the gear segment 102 is limited by engagement of the edge of the arcuate cut-out 112 with the lever 114 adjacent its attachment to the pivot pin 116. Since the gear segment is restrained against further movement, the pinion gear 60 will be arrested, and hence the rotor 32 cannot rotate in the clockwise direction. When the alternating current polarity changes, the rotor 32 will rotate in the counterclockwise direction and the gear segment 102 will be moved back to the full line position as shown in Figure 2.

In order to change the direction or rotation of the motor, it is only necessary to move the lever 120 throughout an angular distance of 90° so that the dimple 122 engages the recess 126 in the gear housing 10. Under these conditions, the rotor 32 is free to rotate in the clockwise direction as viewed in Figure 2 while rotation of the rotor in the counterclockwise direction will be arrested. The direction of rotor rotation can be changed when the motor is stationary or rotating, since the lever 114 is freely movable within the arcuate cut-out 112 of the gear segment 102.

From the foregoing it is readily apparent that the present invention discloses a unique rotor assembly for synchronous motors which substantially increases the starting and running torques of synchronous motors. In addition, the unique direction controlling device enables the synchronous motor to run in either direction as determined by the requirements of the device which it operates, and the direction of motor rotation can be changed with the motor stationary or rotating.

While the embodiments of the invention as herein disclosed constitute a preferred form, it is to be understood that other forms might be adopted.

What is claimed is as follows:

1. A rotor assembly for alternating current synchronous motors comprising an axially magnetized permanent disc magnet having a radial slot therein, and a pair of pole plates clamped to opposite sides of said disc magnet and having dowels engageable with the slot in said permanent magnet to align said pole plates, each pole plate having a radial projection aligned with the slot in said disc magnet so as to produce a balanced rotor.

2. In combination, a rotary pinion, a gear meshing with said pinion, directional drive control means coaxial with said gear and cooperating with said pinion to prevent rotation of said pinion in one direction and to permit rotation thereof in the other direction, and means for adjusting said directional drive control means for changing the direction in which said pinion is permitted to rotate.

3. A directional drive control including, a pair of rotary gears in continuous meshing engagement, a toothed member frictionally engaging the one of said gears and being angularly movable in either direction from a neutral position wherein it is disengaged from the teeth of the other gear to arresting positions wherein it engages the teeth of the other gear, and adjustable stop means engageable with said member for permitting angular movement thereof in only one direction from said neutral position whereby said other gear is prevented from rotating in one direction and permitted to rotate in the other direction.

4. A directional drive control including a pair of rotary gears in continuous meshing engagement, a member frictionally engaging one of said gears having a pair of spaced gear segments, said member being angularly movable in either direction from a neutral position wherein both gear segments are disengaged from the teeth of the other gear to arresting positions wherein one or the other of said gear segments engages the teeth of said other gear, and adjustable stop means engageable with said member for permitting angular movement thereof in only one direction from said neutral position whereby said other gear is prevented from rotation in one direction and permitted to rotate in the other direction.

5. A directional drive control including, a gear housing, a pair of rotary gears supported in said housing and having continuous meshing engagement, a member frictionally engaging one of said gears and having a pair of spaced gear segments, said member being angularly movable in either direction from a neutral position wherein both of said gear segments are disengaged from the teeth of the other gear to arresting positions wherein one or the other of said gear segments engages the teeth of said other gear, and pivotally mounted stop means carried by said housing and engageable with said member for permitting angular movement thereof in only one direction from said neutral position whereby said other gear is prevented from rotating in one direction and permitted to rotate in the other direction.

6. The directional drive control set forth in claim 5 wherein said member and said one gear are coaxially mounted, and wherein said member has a plurality of projections engaging said one gear to establish said frictional engagement therebetween.

7. The directional drive control set forth in claim 5 wherein said member has an arcuate cut-out diametrically opposite said spaced gear segments, and wherein said stop means comprises a lever having arcuate end portions engageable with the arcuate cut-out in said member for preventing angular movement of said member in one direction.

8. The directional drive control set forth in claim 7 wherein said lever is attached to a pivot pin rotatably supported in said housing, and a second lever attached to said pivot pin externally of said housing for adjusting the position of said first lever so as to determine the direction of rotation of said rotor.

9. A rotor assembly for alternating current synchronous motors comprising an axially magnetized permanent disc magnet having a radial slot therein, and a pair of pole plates clamped to opposite sides of said disc magnet, each pole plate having spaced poles arranged circularly about the axis of the disc magnet and having dowels engageable with the slot in the permanent magnet to determine the angular spacing between the poles of said pole plates, each pole plate also having a radial projection aligned with its dowel so as to produce a balanced rotor assembly when the pole plates are clamped on opposite sides of the disc magnet.

10. A rotor assembly for alternating current motors comprising an axially magnetized permanent disc magnet having a radial slot therein, and a pair of pole plates clamped on opposite sides of the disc magnet, each pole plate having spaced poles arranged circularly about the axis of the disc magnet and a dowel engageable with the slot in the disc magnet for determining the angular space between the spaced poles of said pair of pole plates.

11. A directional drive control including, a pair of rotary gears in continuous meshing engagement, directional drive control means driven by one of said gears and coacting with the other of said gears to prevent rotation of said other gear in one direction and permit rotation of said other gear in the other direction, and a movable stop member coacting with said directional drive control means for adjusting the directional drive control means to change the direction in which said other gear is permitted to rotate.

12. In combination, a rotary pinion, a gear meshing with said pinion, directional drive control means cooperating with said pinion to prevent rotation of said pinion in one direction, and means operable during rotation of said pinion for adjusting said directional drive control means to change the direction in which said pinion is permitted to rotate.

References Cited in the file of this patent

UNITED STATES PATENTS

| | | |
|---|---|---|
| 1,996,946 | Beeh | Apr. 9, 1935 |
| 2,059,518 | Harley | Nov. 3, 1936 |
| 2,326,885 | Prince et al. | Aug. 17, 1943 |
| 2,722,297 | Gates | Nov. 1, 1955 |

FOREIGN PATENTS

| | | |
|---|---|---|
| 5710/32 | Australia | Jan. 16, 1933 |
| 59,254 | France | Jan. 6, 1954 |
| 515,924 | Great Britain | Dec. 18, 1939 |
| 588,000 | Great Britain | May 12, 1947 |
| 981,246 | France | Jan. 1, 1951 |